United States Patent
Pearson et al.

(10) Patent No.: US 11,658,469 B2
(45) Date of Patent: May 23, 2023

(54) STACKABLE DUCT-BANK STUB-UP ASSEMBLY

(71) Applicant: Forterra Pipe & Precast, LLC, Irving, TX (US)

(72) Inventors: Matthew Pearson, Minnetonka, MN (US); Branden Maurstad, Minneapolis, MN (US)

(73) Assignee: FORTERRA PIPE & PRECAST, LLC, Irving, TX (US)

( * ) Notice: Subject to any disclaimer, the term of this patent is extended or adjusted under 35 U.S.C. 154(b) by 420 days.

(21) Appl. No.: 16/831,112

(22) Filed: Mar. 26, 2020

(65) Prior Publication Data

US 2021/0305791 A1 Sep. 30, 2021

(51) Int. Cl.
*H02G 3/04* (2006.01)
(52) U.S. Cl.
CPC ......... *H02G 3/0481* (2013.01); *H02G 3/0437* (2013.01)
(58) Field of Classification Search
CPC ........................................................ H02G 3/00
See application file for complete search history.

(56) References Cited

U.S. PATENT DOCUMENTS

| | | | |
|---|---|---|---|
| 1,795,884 A * | 3/1931 | Parker | H02G 9/06 138/112 |
| 2,775,017 A * | 12/1956 | McDonough | E04G 15/04 249/177 |
| 3,574,356 A | 4/1971 | Salerno | |
| 3,742,666 A | 7/1973 | Antoniou | |
| 10,320,167 B2 | 6/2019 | Krause | |
| 2006/0123725 A1 | 6/2006 | Godwin | |
| 2013/0228368 A1* | 9/2013 | Declerck | H02G 1/00 174/481 |

(Continued)

FOREIGN PATENT DOCUMENTS

| | | |
|---|---|---|
| CA | 2057852 A  *  6/1992 | |
| CN | 2057852    12/1991 | |

(Continued)

OTHER PUBLICATIONS

Red-E-Duct Precast Duct Bank Stub-ups (Year: 2019).*

(Continued)

*Primary Examiner* — Hoa C Nguyen
*Assistant Examiner* — John B Freal
(74) *Attorney, Agent, or Firm* — Baker Botts L.L.P.

(57) ABSTRACT

A duct-bank stub-up assembly includes a first pre-formed stub-up module that comprises a first plurality of conduits and a first encasing body. For each of the first conduits, a first end of the conduit provides a mating end on a mating side of the first encasing body and a second end of the conduit provides a mating end on a top surface of the first encasing body. The assembly further includes a second pre-formed stub-up module that comprises a second plurality of conduits and a second encasing body formed to have a stub-up section and a footer section. For each of the second conduits, a first conduit end provides a mating end on a mating side of the footer section and a second conduit end provides a mating end on a top surface of the stub-up section. The first module is positioned on the footer of the second module.

20 Claims, 5 Drawing Sheets

(56) References Cited

U.S. PATENT DOCUMENTS

2014/0300097 A1    10/2014  Krause
2017/0299090 A1*   10/2017  Pearson ............... H02G 3/0487
2018/0231146 A1     8/2018  O'Neil et al.

FOREIGN PATENT DOCUMENTS

CN      205385257 U    7/2016
DE        2937418 C2   9/1979
EP        0 128 082    5/1984

OTHER PUBLICATIONS

Forterra precast duct bank. https://forterrabp.com/site/assets/files/8595/electrical_precast_duct_bank_faq_0410191a.pdf, Downloaded Mar. 11, 2020.

Interfab Underground Conduit Risers. https://interfabsolutions.com/products/underground-conduit-risers/, Downloaded Mar. 11, 2020.

* cited by examiner

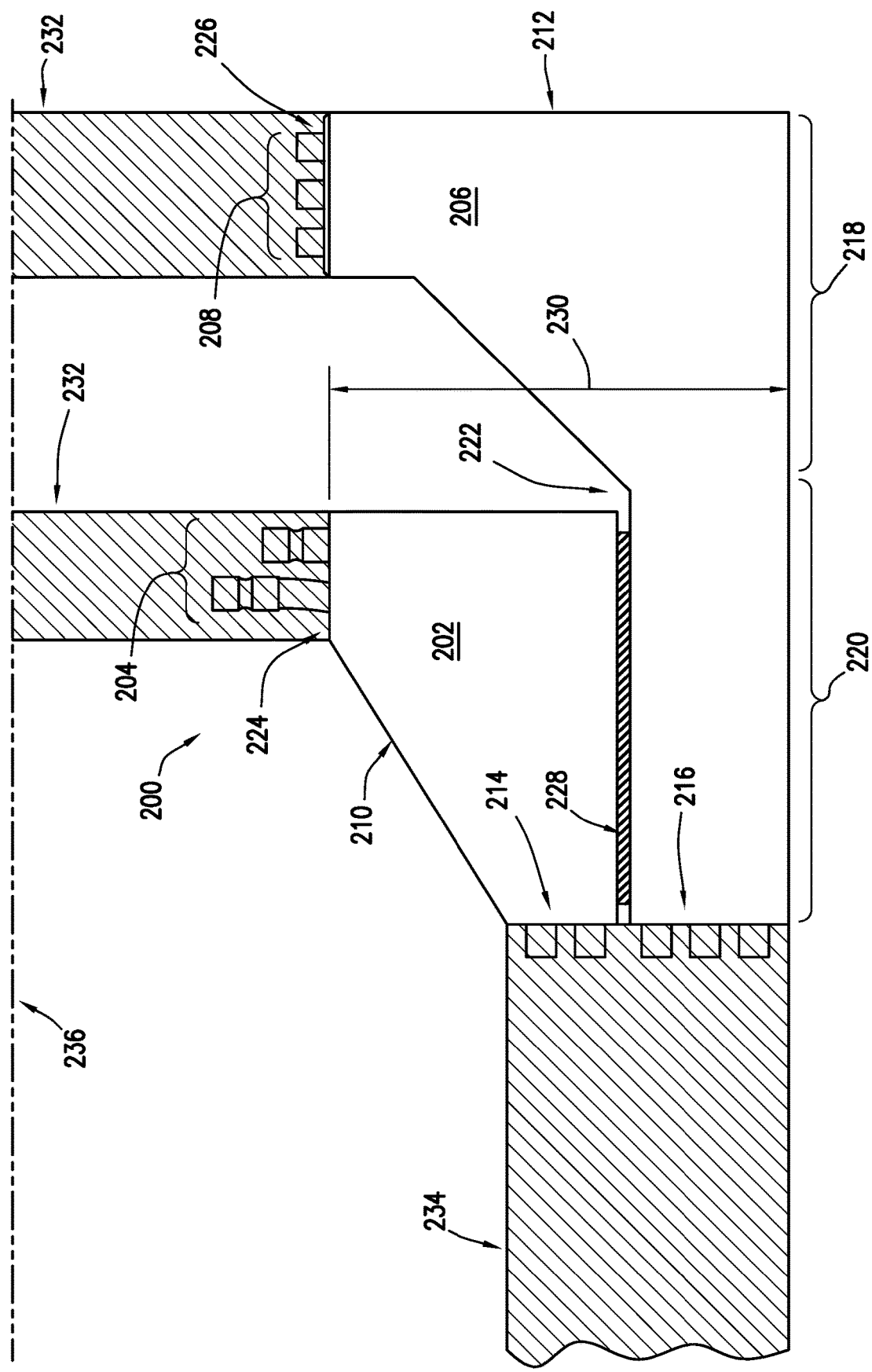

STACKABLE DUCT-BANK STUB-UP ASSEMBLY

TECHNICAL FIELD

This disclosure relates in general to encased conduit assemblies and more particularly to a stackable duct-bank stub-up assembly.

BACKGROUND

When running electrical lines, communication lines, and other types of service delivery media underground, these lines are often passed through conduits to help protect the lines from damage due to adverse conditions or activities. To be able to service buildings, a conduit pathway that runs underground is typically turned upwards so that it can extend from beneath the ground and into a structure.

SUMMARY OF THE DISCLOSURE

A need has arisen for an improved duct-bank stub-up assembly. In accordance with one embodiment of the present invention, a stackable duct-bank stub-up assembly is provided that substantially eliminates or greatly reduces disadvantages and problems associated with conventional stub-up systems.

According to one embodiment, a duct-bank stub-up assembly includes a first duct-bank stub-up module formed before placement. The first module includes a first plurality of curved, elongate conduits for receiving and passing through service delivery media. The first plurality of conduits is comprised of generally parallel conduits in a predefined array. The first module further comprises a first encasing body formed to have a bottom surface, a top surface, and a mating side. The first encasing body is pre-formed around the array of conduits, which are arranged on and during pre-forming of the first encasing body supported in position within the encasing body by a spacer lattice, such that, for each of the first conduits, a first end of the conduit provides a mating end on the mating side of the first encasing body and a second end of the conduit provides a mating end on the top surface of the first encasing body. The second ends of the first conduits are substantially aligned at a first elevation relative to the top surface. The duct-bank stub-up assembly further includes a second duct-bank stub-up module formed before placement. The second module includes a second plurality of curved, elongate conduits for receiving and passing through service delivery media. The second plurality of conduits is comprised of generally parallel conduits in a predefined array. The second module further comprises a second encasing body formed to have a stub-up section and a footer section. The stub-up section has a bottom surface and a top surface, and the footer section has a bottom surface, a top surface, and a mating side. The second encasing body is pre-formed around the array of conduits, which are arranged on and during pre-forming of the second encasing body supported in position within the encasing body by a spacer lattice, such that the second conduits extend through the footer section and the stub-up section. For each of the second conduits, a first end of the conduit provides a mating end on the mating side of the footer section and a second end of the conduit provides a mating end on the top surface of the stub-up section. The second ends of the second conduits are substantially aligned at a second vertical elevation. The first module is positioned on the footer of the second module. The first and second modules are sized such that the first vertical elevation and the second vertical elevation are substantially aligned.

In a further embodiment, a duct-bank stub-up assembly includes a first duct-bank stub-up module formed before placement. The first module includes a first plurality of curved, elongate conduits for receiving and passing through service delivery media. The first module further includes a first encasing body formed to have a bottom surface, a top surface, and a mating side. The first encasing body is formed around the first conduits such that, for each of the first conduits, a first end of the conduit provides a mating end on the mating side of the first encasing body and a second end of the conduit provides a mating end on the top surface of the first encasing body. The duct-bank stub-up assembly further includes a second duct-bank stub-up module formed before placement. The second module comprises a second plurality of curved, elongate conduits for receiving and passing through service delivery media. The second module further comprises a second encasing body formed to have a stub-up section and a footer section, the stub-up section having a bottom surface and a top surface, and the footer section having a bottom surface, a top surface, and a mating side. The second encasing body is formed around the second conduits such that the second conduits extend through the footer section and the stub-up section. For each of the second conduits, a first end of the conduit provides a mating end on the mating side of the footer section and a second end of the conduit provides a mating end on the top surface of the stub-up section. The first module is sized for placement on the footer of the second module.

According to one embodiment, a method of making a duct-bank stub-up assembly comprises providing a first plurality of curved, elongate conduits for receiving and passing through service delivery media, supporting the first conduits at a position suitable for their encasement in the stub-up assembly, and forming a first encasing body around the first conduits, the first encasing body having a bottom surface, a top surface, and a mating side. The method also includes providing, on a first end of each of the first conduits, a mating end on the mating side of the first encasing body, and providing, on a second end of each of the first conduits, a mating end on the top surface of the first encasing body. The method further includes providing a second plurality of curved, elongate conduits for receiving and passing through service delivery media, supporting the second conduits at a position suitable for their encasement in the stub-up assembly, and forming a second encasing body around the second conduits, the second encasing body having a stub-up section and a footer section. The stub-up section has a bottom surface and a top surface, and the footer section having a bottom surface, a top surface, and a mating side. The formation of the second encasing body further comprises extending the second conduits through the footer section and the stub-up section. Lastly, the method includes providing, on a first end of each of the second conduits, a mating end on the mating side of the footer section and providing, on a second end of each of the second conduits, a mating end on the top surface of the stub-up section.

Technical advantages of certain embodiments may include decreasing the weight of encasing material used in the duct-bank assembly. This can facilitate maneuverability during duct-bank placement, while still allowing for the accommodation of desired conduit spacing and duct routing. Further advantages may include reducing the time and costs required for pre-cast duct-bank stub-up installation compared to the use of cast-in-place concrete. Other advantages of certain embodiments of the assembly are improved customizability, improved shipping (including cost reductions for shipping), the ability to have a set of common components assembled to provide job-specific configurations, the ability to handle more complex geometries and configurations, and the ability to handle increased service delivery media within a given footprint. Moreover, severing or otherwise interrupting encased lines, wire, or cables may be avoided due to the protection afforded by the encasing material and conduits. Although specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIG. 2 illustrates a side elevation view of a duct-bank stub-up assembly mated to formations beneath a final grade elevation, according to certain embodiments;

DETAILED DESCRIPTION OF THE DISCLOSURE

Figure 1:
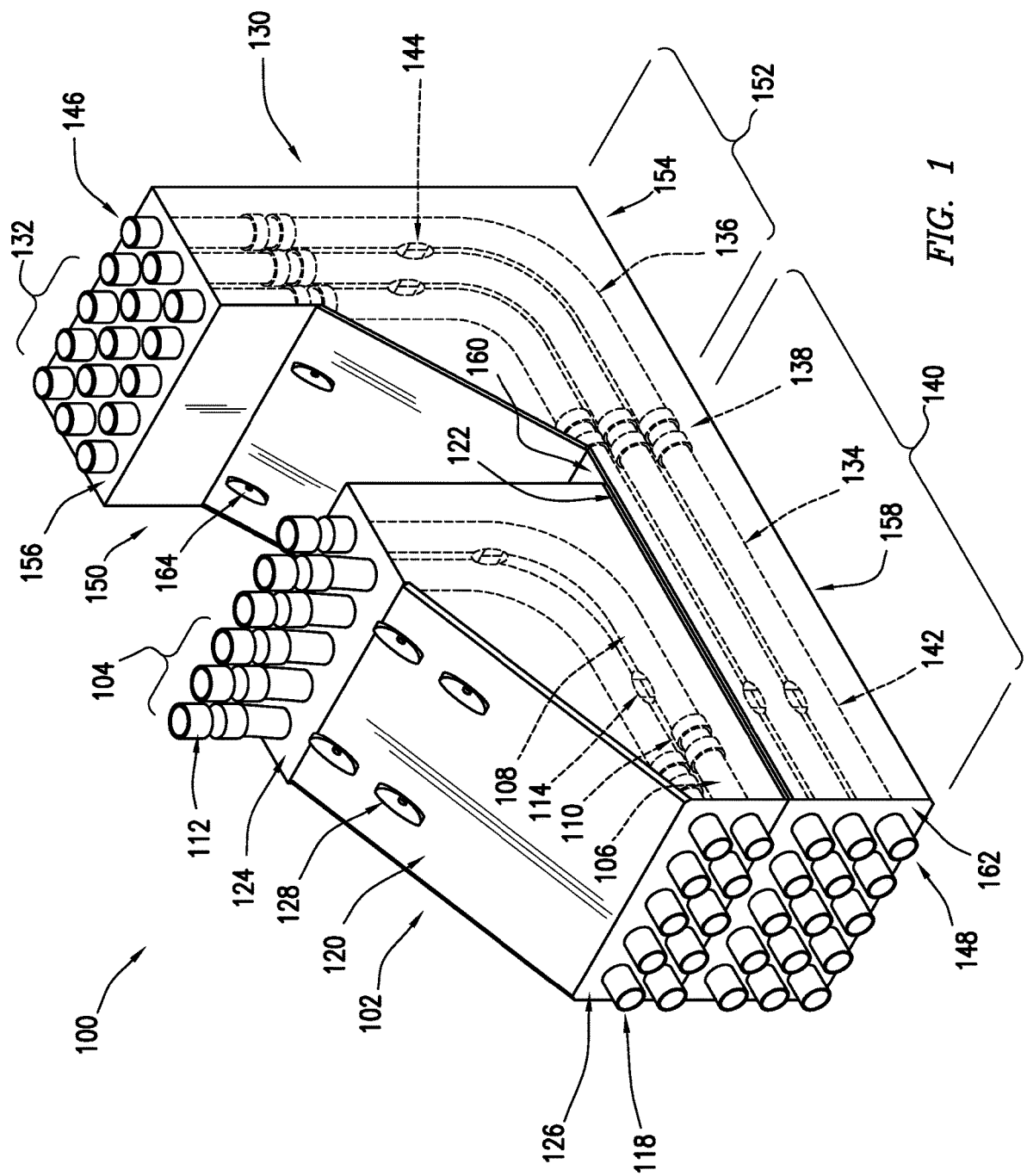
FIG. 1 illustrates an isometric and interior view of a duct-bank stub-up assembly, according to certain embodiments.

When running electrical lines, communication lines, and other types of service delivery media underground, these lines are often passed through conduits or pipes to help protect the lines from damage due to adverse conditions or activities. In some cases, to provide further protection, the conduits are encased in concrete or other formable materials. The lines can then be passed through a series of these encased conduit units (often referred to as duct-banks) and deliver services to buildings and the like. In particular, prefabricated duct-bank modules can be formed before placement and then multiple preformed duct-bank modules can be positioned and mated together to create a protected conduit pathway. Compared to the cast-in-place approach, in which concrete may be poured into a formwork to encase the conduits after the conduits have been placed into an excavation at a project site, the pre-formed approach may allow for faster installation on a job site with reduced in risk of delays, reduced risk that the conduit assembly will be disturbed by the pour, and elimination of the need to wait for the concrete to cure at the project site prior to replacement of excavated fill material.

A conduit pathway that runs underground is typically turned upwards so that the service delivery lines can extend from beneath the ground into a structure. This turning point of the pathway is often referred to as a stub-up. Curved conduits can be encased to create duct-bank stub-up modules.

In some cases, construction parameters may require a high concentration of conduit stub-up pathways to extend into a building within a defined area, such as a closet space. This presents challenges, especially when using pre-formed duct-banks, because placement of multiple preformed duct-bank stub-up modules may not allow the conduits to be sufficiently concentrated to meet the defined area parameters. For instance, this may be the case for turn-ups for installations with cable racks. Also, attempting to use a small number of large capacity stub-up duct-bank modules (or a single duct-bank module) can lead to inefficient use of encasing material, increased costs, wasted resources, and interference with adjacent building components, among other problems. The use of a greater-than-necessary amount of encasing material may increase the weight of the resulting structure. Accordingly, a particular configuration of pre-cast stub-up units that allows for concentration of conduits with a defined area, while minimizing the weight of the encasing material used, may be desirable.

The teachings of this disclosure recognize the use of a pre-formed duct-bank stub-up assembly that not only allows for the placement of multiple stub-up conduit arrays within a defined area, but that also reduces the necessary amount of encasing material required to achieve this configuration. This assembly may be particularly useful for turn-ups for installations with cable racks. Using such an assembly may result in various other benefits, including, but not limited to, decreasing the weight of encasing material used in the duct-bank assembly. Reducing the amount of encasing material used may facilitate the maneuverability of the duct-bank modules during placement in an excavation. Moreover, severing or otherwise interrupting encased lines, wire, or cables may be avoided due to the protection afforded by the encasing material and conduits. Electrical power delivery, fluid flow, communication, or other activities may thus be conducted via the lines, wires, cables, pipes, or other service delivery media in the duct-banks, and interruption of these activities due to damage to the connecting lines may be substantially reduced or avoided. Furthermore, the use of pre-formed duct-bank stub-up modules would reduce the time and costs required for duct-bank stub-up installation compared to a cast-in-place approach. The following describes systems and methods of a duct-bank stub-up assembly for providing these and other desired features.

FIG. 1 illustrates an isometric and interior view of an example duct-bank stub-up assembly 100, according to certain embodiments. As illustrated, duct-bank stub-up assembly 100 includes a stub-up module 102 and a stub-up module 130. Stub-up module 102 includes conduits 104, lifting devices 128, spacers 114, and an encasing body 120 having a bottom surface 122, a top surface 124, and a mating side 126. Stub-up module 130 includes conduits 132, lifting devices 164, spacers 144, and an encasing body 150 having a stub-up section 152 with a bottom surface 154 and a top surface 156 and a footer section 140 with a bottom surface 158, a top surface 160, and a mating side 162. Specifically, duct-bank assembly 100 is configured so that stub-up module 102 can be placed on top of footer section 140 of stub-up module 130. As illustrated, there is an area between top surface 124 and top surface 156 where encasing material is absent, allowing for efficient use of encasing material and reduction in weight.

As illustrated, encasing body 120 and encasing body 150 are formed around conduits 104 and conduits 132, respectively. According to particular embodiments, encasing body 120 and/or encasing body 150 is pre-cast, rather than cast-in-place around conduits previously placed in an excavation site. Although this disclosure describes and depicts encasing body 120 and encasing body 150 as being comprised of concrete, this disclosure also contemplates that duct-bank assembly 100 could be comprised of other materials, such as geopolymers, a cement substitute, or any other material or mixture of materials that can withstand the external loads applied to assembly 100 upon placement in an excavation. In some embodiments, the material for the encasement may be a 4000 PSI concrete with a maximum ¼" aggregate. Other strengths of concrete and aggregate sizes may also be used, depending on application. The precast concrete encasements may be reinforced or unreinforced (e.g., with rebar added), and a variety of additives may be used. For example, additives such as plasticizers, super plasticizers, air entrainment, colorings such as red dyes or other coloring or additives can also be provided.

Encasing body 120 and/or encasing body 150 are made as modular units with a range in base lengths from approximately 2 feet to approximately 20 feet or longer, depending on application. Encasing body 120 and encasing body 150 may be any size that is sufficient to contain the requisite number of conduits for the particular application and of any height that prevents interference with an overhead structure. The heights of encasing body 120 and encasing body 150 vary depending, for example, on the intended general depth of placement. Encasing body 120 and encasing body 150 and could be made with a range in heights from approximately 2 feet to approximately 20 feet. Encasing body 120 has dimensions that allow it to be stable when placed onto footer section 140 of encasing body 150. Although this disclosure depicts the dimensions of bottom surface 122 of encasing body 120 having an equivalent width and smaller length than the dimensions of top surface 160 of footer 140, this disclosure also contemplates that the dimensions of bottom surface 122 may be smaller than, larger than, or equivalent to the dimensions of top surface 160. Furthermore, as illustrated, encasing body 120 has a height that is shorter than the height of encasing body 150. According to certain embodiments, the height of encasing body 120 and the length of its bottom surface 122 allow for the substantial alignment of top surface 124 and top surface 156 relative to each other and/or the substantial alignment of mating side 126 and mating side 162 relative to each other when module 102 is placed onto footer 140 of module 130. While the substantial alignment of the top surfaces and the substantial alignment of the mating sides of stub-up module 102 and stub-up module 130 are illustrated in FIG. 1, only the top surfaces, only the mating sides, or neither the top surfaces nor the mating sides could be substantially aligned in particular embodiments. The relative sizes and alignments of encasing body 120 and encasing body 150 will be explained further below in reference to FIG. 2.

As illustrated, encasing body 120 is formed around conduits 104 such that it has bottom surface 122, top surface 124, and mating side 126. Bottom surface 122, as illustrated, is chamfered. Top surface 124 is a mating end that is configured to couple to an adjacent module, such as a cast-in-place riser. Furthermore, as illustrated, encasing body 150 is formed around conduits 132 such that it has stub-up section 152, with bottom surface 154 and top surface 156, and footer section 140, with bottom surface 158, top surface 160, and mating side 162. Bottom surface 154, as illustrated, is chamfered. Top surface 156 is a mating end that is configured to couple to an adjacent module, such as a cast-in-place riser. Although the faces of encasing body 120 and encasing body 150 are illustrated as being perpendicular to bottom surface 122 and bottom surface 154, one or more faces of encasing body 120 and/or encasing body 150 could taper from bottom surface 122 or 154 towards top surface 124 or 156, respectively.

Footer section 140 is a generally elongate and rectangular section that accepts stackable encasing body 120, as illustrated. Footer 140 may be reinforced or unreinforced (e.g., with rebar added). The relative dimensions of footer 140 and encasing body 120 will be discussed further below in reference to FIG. 2.

Although this disclosure depicts encasing body 120 and encasing body 150 as having substantially flat mating sides 126 and 162, encasing body 120 and/or encasing body 150 could have a shear transfer mechanism at mating side 126 and/or mating side 162 of footer section 140, respectively. The shear transfer mechanisms on encasing body 120 and/or encasing body 150 engage with corresponding shear transfer mechanisms of an adjacent duct-bank assembly to resist relative motion between mating side 126 and/or mating side 162 and an encasing body of the abutting, adjacent duct-bank assembly module resulting from differential shear loading. This will be discussed further below in reference to FIGS. 3A-C.

According to particular embodiments, assembly 100 includes complementary locking structures formed on top surface 160 of encasing body 150 and bottom surface 122 of encasing body 120, whereby the stacking of module 102 on module 130 in a manner to encage complementary locking structure limits lateral movement of the stacked modules relative to each other.

As illustrated, lifting devices 128 and lifting devices 164 are embedded within encasing body 120 and encasing body 150, respectively. Each encasing body has one or more lifting devices to aid in lifting and placing the modular units. Lifting devices 128 and lifting devices 164 may be comprised of steel, another metal or alloy, or any other material or mixture of materials that can withstand the loads applied when the modules are lifted to be placed.

As illustrated, conduits 104, which are designed to receive and pass through service delivery media, include straight conduits 106 and conduit elbows 108 coupled at coupling 110. Conduits 104 are held in an array by spacers 114. As illustrated, each conduit 104 has an end 118 located at mating side 126 and an end 112 located at top surface 124. Furthermore, conduits 132, which are designed to receive and pass through service delivery media, include straight conduits 134 and conduit elbows 136 coupled at coupling 138. Conduits 132 may be held in an array by spacers 144. As illustrated, each conduit 132 has an end 148 located at mating side 162, and an end 146 located at top surface 156.

As illustrated, conduits 104 and conduits 132 are open at each end and extend through encasing body 120 and encasing body 150, respectively. Conduits 104 and conduits 132 comprise at least one flexible or rigid conduit, pipe, pipe sleeve, duct, or other hollow body formed by an elongate tubular wall and defining a passage. Conduits 104 and conduits 132 may be comprised of fiberglass, coated steel, stainless steel, aluminum, polyvinyl chloride (PVC), chromed metal, galvanized metal, copper, polyethylene, or any other suitable material or mixture of materials that can withstand the external load applied by the encasing material. Conduits 104 and conduits 132 have a wall thickness suitable for concrete encasement and to allow for the walls to be threaded. The pipes may be Nominal Pipe Size (NPS) two-inch, three-inch, four-inch, five-inch, or six-inch diameter pipes, or other diameters may be used. While conduits 104 and conduits 132 are illustrated as having a circular cross section, they may have a square cross section, triangular cross section, or a cross section of any other shape. Conduits 104 and 132 may contain, for example, wires, cables, communication lines, information lines, power lines, electrical lines, warm or cool air, water, and/or other fluids.

As illustrated, conduits 104 and/or conduits 132 are comprised of generally parallel conduits arranged in a predefined array within the encasement 120 and/or encasement 150, respectively. Several different, pre-defined arrays of conduits 104 and 132 may be provided within encasements 120 and 150, ranging from 1×1 (single pipe) to 5×5 (twenty-five pipes in a square array (viewed from ends)), or any number necessary. While the conduit arrays in stub-up modules 102 and 130 are illustrated as being rectangular, the conduit arrays could be circular, triangular, or any other shape or configuration. Duct-banks can be made in various capacities, and are not limited to the 2 by 5 and 3 by 5 modules illustrated. The number of conduits in a module can be adapted to any particular application so that other larger and smaller arrays may be provided within encasing bodies 120 and 150. The number and/or array configuration of conduits 104 within encasing body 120 may be the same or different as the number and/or array configuration of conduits 132 within encasing body 150.

As illustrated, each of the conduits within conduits 104 and/or conduits 132 are spaced from one another to provide sufficient flow of encasing material between the pipes during forming of encasing bodies 120 and 150, respectively. Furthermore, the conduits are spaced to dissipate heat and establish separation to address issues of cross-talk or electrical leakage or arcing between electrical and communication lines in adjacent pipes. According to particular embodiments, the clear spacing between the pipes may be 1½ inches (measured between pipe outer surfaces). In certain embodiments, it may be 3 inches. Lesser or additional clear distance may also be provided, depending on the application.

For each of the conduits 104 and 132, as illustrated, a first end 118 and/or 148 provides a mating end on mating side 126 of first encasing body 120 and a mating end on mating side 162 of second encasing body 130, respectively. Furthermore, a second end 112 and/or 146 provides a mating end on top surface 124 of first encasing body and a mating end on top surface 156 of second encasing body 130. As illustrated, first end 118 and first end 148 extend to a certain distance from mating side 126 and mating side 162, and second end 112 and second end 146 extends to a certain distance from top surface 124 and top surface 156, respectively. The extension distances of the conduit mating ends may be the same or different at the mating sides 126 and 162 and/or the top surfaces 124 and 156. While second ends 112 and 146 of conduits 104 and 132 are illustrated as extending to different vertical elevations relative to top surface 124 and top surface 156, second ends 112 and 146 of conduits 104 and 132 could extend to the same vertical elevation relative to top surface 124 and top surface 156 or extend to the same vertical elevation relative to each other (such that both ends 112 and 146 extend to the same elevation from bottom surface 134 of module 130). Furthermore, as illustrated with respect to the array of conduits 104, one or more rows of conduits within the arrays of conduits 104 and/or conduits 132 could extend to a different vertical elevation than other rows within the same array. In certain embodiments, all conduits within the arrays of conduits 104 and/or conduits 132 may extend so that they are substantially aligned at a determined vertical elevation, as illustrated with respect to the array of conduits 132. According to particular embodiments, encasing body 120 and/or encasing body 150 may be provided around the conduits 104 and 132 in such a way first ends 118 and/or 148 are substantially flush with mating side 126 and/or 162. Furthermore, second end 112 and/or 146 may be substantially flush with top surface 124 and/or 156 of the encasing bodies.

As illustrated, conduits 104 and conduits 132 include straight conduits 106 and 134 and conduit elbows 108 and 136 coupled at couplings 110 and 138, respectively. Although FIG. 1 illustrates conduit elbow 108 as coupled at one end and conduit elbow 136 coupled at both ends, this illustration should not be construed as limiting. For example, conduit elbows 108 within stub-up module 102 could be coupled to encased, straight conduit sections at both ends, and/or the conduit elbows 136 within stub-up module 130 may be coupled at only one end. Furthermore, while this disclosure depicts and describes straight conduits 106 and 134 and conduit elbows 108 and 136 as coupled at couplings, straight conduits 106 and/or 134 and conduit elbows 108 and/or 136 may be coupled at belled ends.

Conduit elbow 108 and conduit elbow 136 may be configured of fiberglass, PVC, or any other suitable material. Moreover, conduit elbows 108 and 136 may be made of the same material or different materials, and may be made of the same material or of different materials than straight conduits 106 and 134. As illustrated, conduit elbow 108 and conduit elbow 136 are configured to curve such that a first end of each conduit elbow 108 is proximate to mating side 126 of encasing body 120 and a first end of each conduit elbow 136 is proximate to mating side 162 of encasing body 150, while a second end of each conduit elbow 108 is proximate to top surface 124 and a second end of each conduit elbow 136 is proximate to top surface 156. According to particular embodiments, conduit elbow 108 and/or conduit elbow 136 has a smooth radius that completes an approximately 90-degree curve. In some embodiments, the radius may have two approximately 45-degree bends. Although conduit elbow 108 and conduit elbow 136 are illustrated as having a curve of 90 degrees, the curve of conduit elbow 108 and/or conduit elbow 136 may be any angle, greater than or less than 90 degrees, that allows the second end of the conduit elbow to be proximate to top surface 124 or top surface 156, respectively.

In some applications, it will be desirable to provide a seal between one duct-bank module and an adjacent duct-bank module such that the conduit ends 112, 118, 146, and 148 form conduit pathways with the conduits of abutting modules when the conduits are placed in an end-to-end relationship. In order to at least partially seal these conduits and further protect them against concrete from seeping into the conduit pathway during casting operations, conduit ends 118 and 148 may comprise a gasket or O-ring for forming a watertight seal when coupled to a corresponding conduit end. Depending on the particular environment and application, seals may not be required.

Spacers 114 and 144 with conduit receiving surfaces and openings sized for various conduit diameters are used to build a supported array of conduits 104 and conduits 132 in a particular configuration of separation and positioning, during a pour of encasing material and remaining embedded thereafter. Spacers 114 and 144 may be comprised of plastic, metal, any suitable material that will not deform under pressures associated with the casting process. In some embodiments, spacers come with interlocking components, so that rows of adjacent conduits are supported and additional rows of adjacent conduits are placed on a row below. Spacers 114 and 144 may be used at regular intervals along the length of the supported conduits within conduits 104 and conduits 132. According to particular embodiments, a single planar lattice of spacers near the center of the pour is used and the bulk head or pour cap end at each end may support the pipe at each end. In some embodiments, spacers are spread out and not built into a single plane, such that the lattice may be seen in an end view of a conduit array, but in a plan view the spacers are seen as appearing at intervals. Thus, spacers 114 and 144 can be placed to position conduits 104 and 132 to achieve a predefined geometry and placement. Given the loading of the poured concrete, spacers can also help ensure that conduits 104 and/or 132 keep linear structure and are not bowed downward or tilted upward in some portions of the length so as to cause displacement or tilting of first conduit ends 118 and 148 or second conduit ends 112 and According to particular embodiments, cushion material is placed between top surface 160 of footer section 140 and bottom surface 122 of encasing body 120. This will be further explained below in reference to FIG. 2.

As illustrated, module 102 of duct-bank stub-up assembly 100 is configured to be placed on top of footer section 140 of module 130. The structure and size of module 102 and module 130 allows for the stacking of the modules to create assembly 100. The stacked encasing bodies 120 and 150 comprising assembly 100 can then be placed in series and/or in tandem with adjacent duct-bank units, with mating sides 126 and 162 of the assembly in a mating relationship with the end of an adjacent longitudinally extending duct-bank (or duct-banks) and top surfaces 124 and 156 in a mating relationship with a mating end of an adjacent vertically extending duct-bank (or duct-banks). This will be further discussed below in reference to FIG. 2.

While the disclosure above describes a particular embodiment of duct-bank assembly 100, one of skill in the art would appreciate that many changes could be made to the assembly and still be within the scope of the present disclosure. For example, encasing body 120 and encasing body 150 may have different three-dimensional shapes, as illustrated, or, in some embodiments, encasing body 120 and encasing body 150 may have the same three-dimensional shape. In some embodiments, encasing body 120 could have a stub-up section and a footer section. The array, the spacing, and clearances between conduits 104 and conduits 132 define the overall geometry and shape of encasing body 120 and encasing body 150, respectively. According to particular embodiments, bottom surface 122 and/or bottom surface 154 may not be chamfered. Moreover, although conduits 104 and 132 are illustrated as being formed by several separate pieces, conduits 104 and/or 132 may be unitary elements. As another example, in some embodiments, only one encasing body or neither encasing body may have lifting devices 128 or lifting devices 164. Furthermore, while encasing body 120 and encasing body 150 are illustrated as being comprised of the same material, encasing body 120 and encasing body 150 could be comprised of different materials. Lastly, in certain embodiments, assembly 100 may not include complementary locking structures on top surface 160 of encasing body 150 and bottom surface 122 of encasing body 120.

FIG. 2 illustrates a side elevation view of a duct-bank stub-up assembly 200 mated to cast-in-place formations beneath a final grade elevation, according to certain embodiments. As illustrated, duct-bank stub-up assembly 200 includes a stub-up module 202 and a stub-up module 206. Stub-up module 202 includes conduits 204 and an encasing body 210 having a top surface 224 and a mating side 214. Stub-up module 206 includes conduits 208 and an encasing body 212 having a stub-up section 218 with a top surface 226 and a footer section 220 with a top surface 222, and a mating side 216. Specifically, as illustrated, duct-bank assembly 200 is configured so that stub-up module 202 can be placed on top of footer section 220 of stub-up module 206 and cushion material 228. Furthermore, duct-bank assembly 200 forms conduit pathways with abutting collar 234 and risers 232 at its mating sides 214 and 216 and top surfaces 224 and 226. Assembly 200 is sized to be placed beneath final grade elevation 236, as illustrated.

According to certain embodiments, but not all embodiments, encasing body 210 and encasing body 212 are sized such that, when module 202 is placed on top surface 222 of footer section 220, top surface 224 and top surface 226 are substantially aligned at vertical elevation 230. Furthermore, as illustrated, encasing body 210 and encasing body 212 are substantially aligned against collar 234 at mating side 214 and mating side 216 in some embodiments.

Collar 234 abuts mating side 214 and mating side 216, as illustrated, to align the spacing between stacked module 202 and module 206 so that mating sides 214 and 216 align. Collar 234 may be cast-in-place or pre-formed.

Risers 232 abut top surface 224 and top surface 226, as illustrated, and extend upwardly to meet or extend above final grade elevation 236. Risers 232 may be cast-in-place or pre-formed.

As illustrated, cushion material 228 is placed between top surface 222 of footer section 220 and the bottom surface of encasing body 202. Cushion material 228 may be comprised of polyester, glass fiber, cellulose fibers, or any other material that is sufficient to prevent localized spalling between module 202 and module 206. Cushion material 228 may be sized to have equivalent dimensions to top surface 222 of footer 220, or it may be smaller or larger.

When assembly 200 is arranged for end-to-end mating, the extended ends of conduits 204 and/or 208, as illustrated, may be coupled to conduits of an adjacent collar 234 and/or riser 232, thereby inserted beyond the surface of the encasement of the adjacent duct-bank, allowing mating sides 214 and 216 and/or top surfaces 224 and 226 to abut the mating end surfaces of the adjacent duct-bank.

Although the disclosure above describes a particular embodiment of a duct-bank stub-up assembly, one of skill in the art would appreciate that many changes could be made and still be within the scope of the present disclosure. For example, encasing body 210 and encasing body 212 may have different three-dimensional shapes, as illustrated, or, in some embodiments, encasing body 210 and encasing body 212 may have the same three-dimensional shape. As another example, encasing body 210 may be sized such that top surface 224 does not substantially align with top surface 226 at elevation 230 and/or such that mating side 214 does not substantially align with mating side 216 at collar 234. According to particular embodiments, 202 may be placed partially on footer section 220 and partially onto the top of another, abutting duct bank assembly that is coupled to footer section 220. Furthermore, while FIG. 2 illustrates collar 234 as a unitary module, collar 234 could be two stacked, elongate duct-bank assemblies, according to particular embodiments.

Figure 3A:
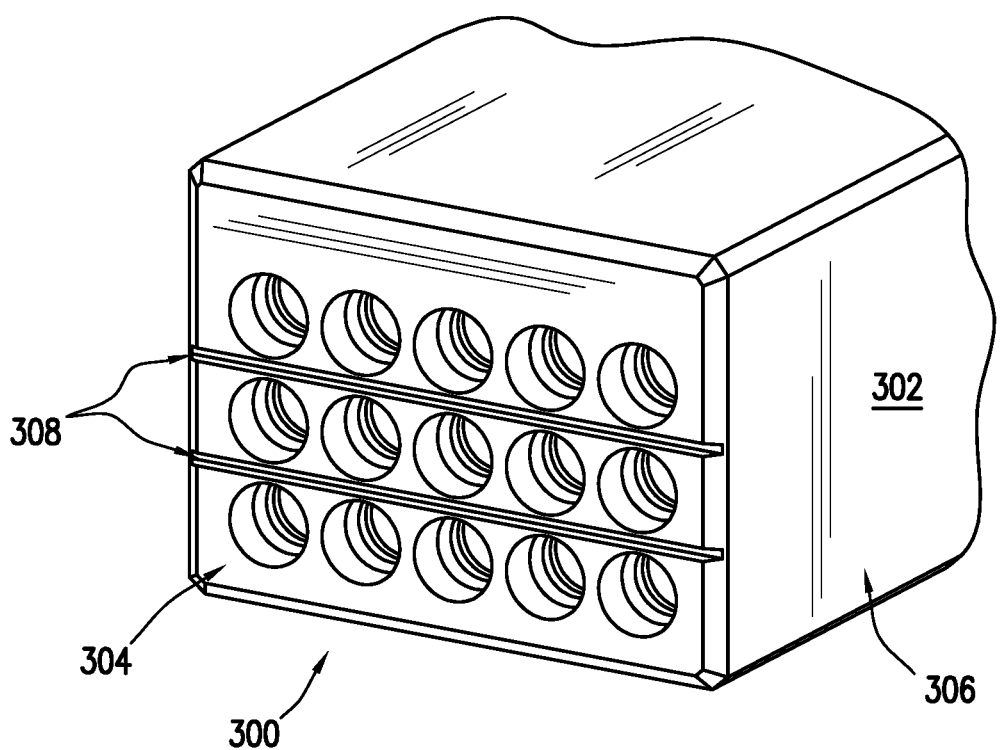
FIGS. 3A, 3B, and 3C illustrate optional partial end perspective views of a second encasing body footer, according to certain embodiments, showing alternative shear transfer mechanisms on the mating side.
Figure 3B:
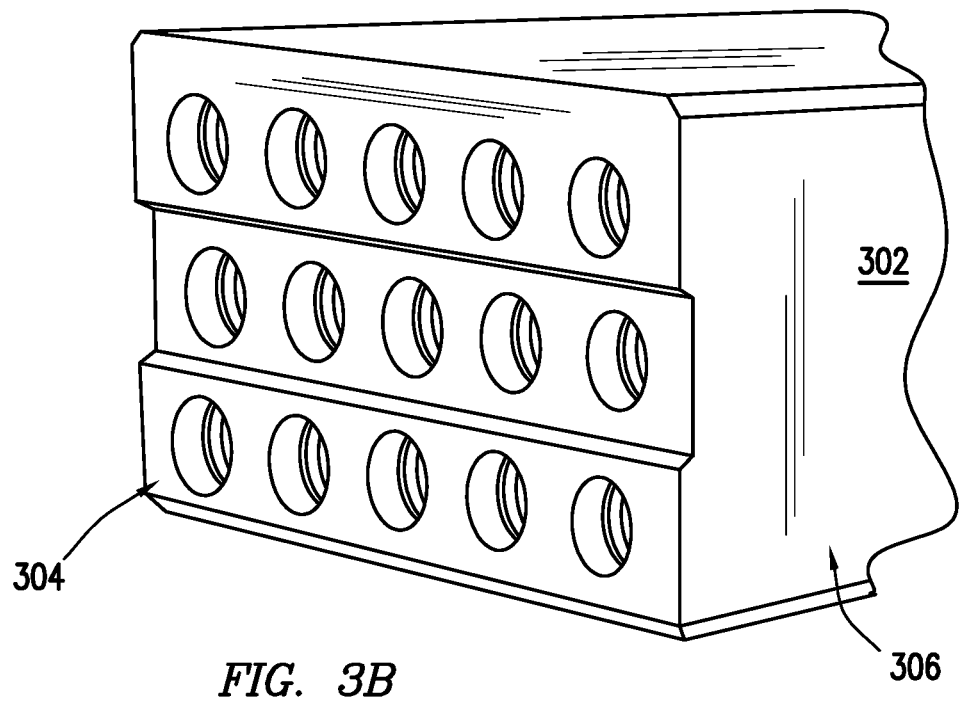
Figure 3C:
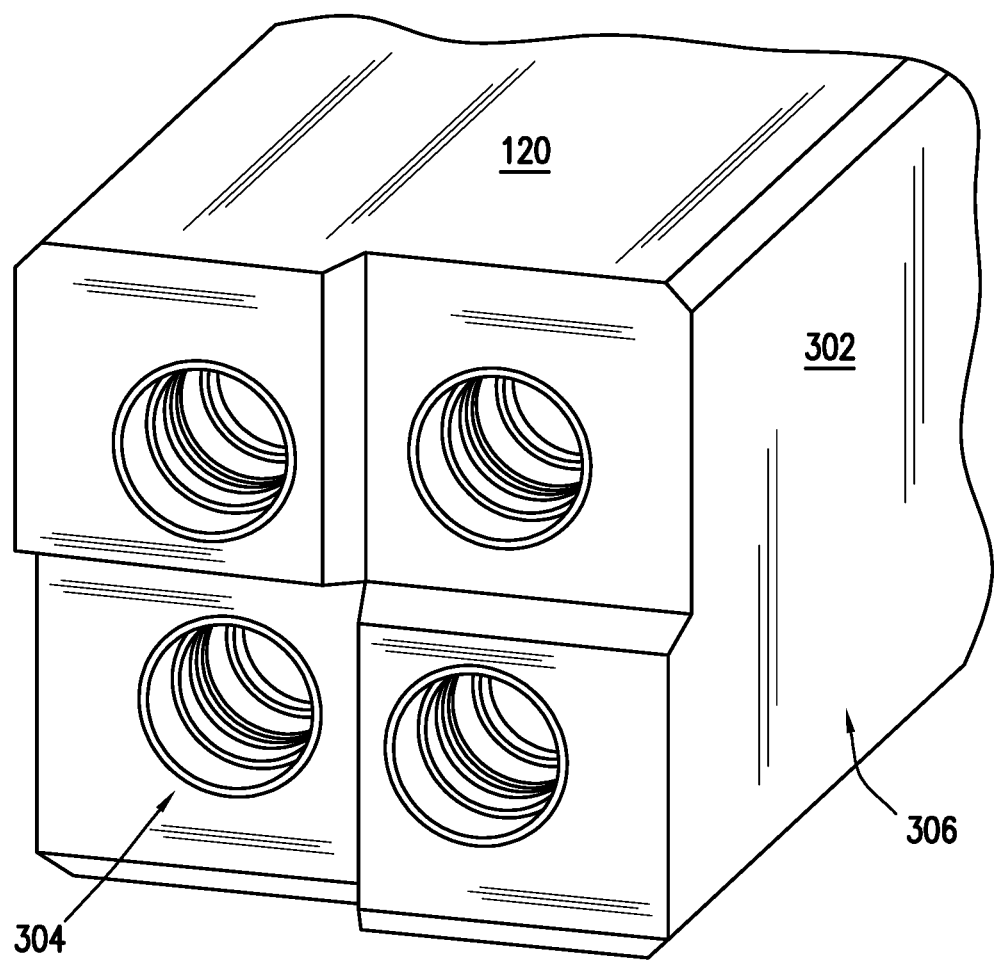

FIGS. 3A, 3B, and 3C illustrate optional partial end perspective views of a second encasing body footer, according to certain embodiments, showing alternative shear transfer mechanisms on the mating side.

As illustrated, a footer section 306 of an encasing body 302, a component of a second duct-bank stub-up module 300, has a mating side 304. Mating side 304 includes a shear transfer mechanism or structure that is designed to keep adjacent, mated ends in stable connection when a shear load is applied, for example by shifts in surrounding soil or fill or a temporary load of a vehicle passing over. As illustrated by FIG. 3A, mating side 304 of footer 306 includes one or more mating keyways 308 and the mating end of an adjacent encasement may include one or more shear keys (not shown). When two assemblies are arranged end-to-end, a mating keyway 308 on mating side 304 may engage the shear key on the corresponding mating end of an encasing body of an adjacent duct-bank assembly. The illustrated duct-bank assembly includes a shear key system to minimize relative vertical motion between adjacent duct-bank assemblies. These systems also relieve shear loads that may be applied to the ends of conduits at the plane of abutment.

According to particular embodiments, the shear key system is designed to carry a differential shear loading roughly equivalent to or exceeding an HS-20 axle loading. In some embodiments, the mating keyway 308 may extend across the end of the duct-bank assembly and have a tapered, cross-sectional shape, as illustrated in FIG. 3B. For example, the cross-sectional shape of the mating keyway 308 may be a nominal 1" by 1" square with ⅛" taper on opposed, longitudinal sides to facilitate insertion of the shear key. The mating keyway 308 may be larger or smaller and the size of the shear key may be adjusted and selected based on the load transfer required and the length available for the shear key. In some embodiments, the cross-sectional shape of the shear key may be ½" by ½", 2" by 2", 3" by 3", or some other selected size and the cross-sectional shape may be other than generally square, for example, and may be rectangular, trapezoidal, triangular, semicircular, or some other selected shape. The taper may be greater or less than ⅛" and in some embodiments, a taper may not be provided.

In some embodiments, the shear transfer mechanism will be oriented and configured to resist loads other than vertical loads or to resist loads in more than one direction. For example, as illustrated in FIG. 3C, a shear key structure described may be provided in the form of a rectangle and may have a shape when viewed from the end of the precast assembly that is like a picture frame-shaped, outwardly extending rib, for example, for mating with a corresponding keyway in the form of a picture-frame shaped recess. In this embodiment, the laterally extending portions may resist differential vertical loads while the vertically extending portions may resist different lateral loads. In another embodiment, a shear transfer mechanism is formed with generally cylindrical protrusions of one assembly end mating with generally cylindrical recesses of the other assembly end. Other arrangements for transfer of loads in more than one direction may be provided.

While a shear key embodiment has been shown, in some alternative embodiments, a shear resisting structure may include a stair stepped bevel end, precast support foundation, or other foundation between adjoining assemblies. Grouted dowels, embeds with weld plates, or other structures or mechanisms, with static features or moving parts, may also be provided to transfer shear loads at mating assembly ends and resist relative vertical or horizontal motion between abutted assemblies.

While FIGS. 3A-C illustrate particular embodiments of shear transfer mechanisms on footer section 306 of second encasing body 302, the illustrated embodiments should not be construed as limiting. For example, a mating side of a first encasing body may also have a shear transfer mechanism. As another example, mating keyway 308 may be on the mating end of the adjacent encasement, and the shear key may be on mating side 304.

Figure 4:
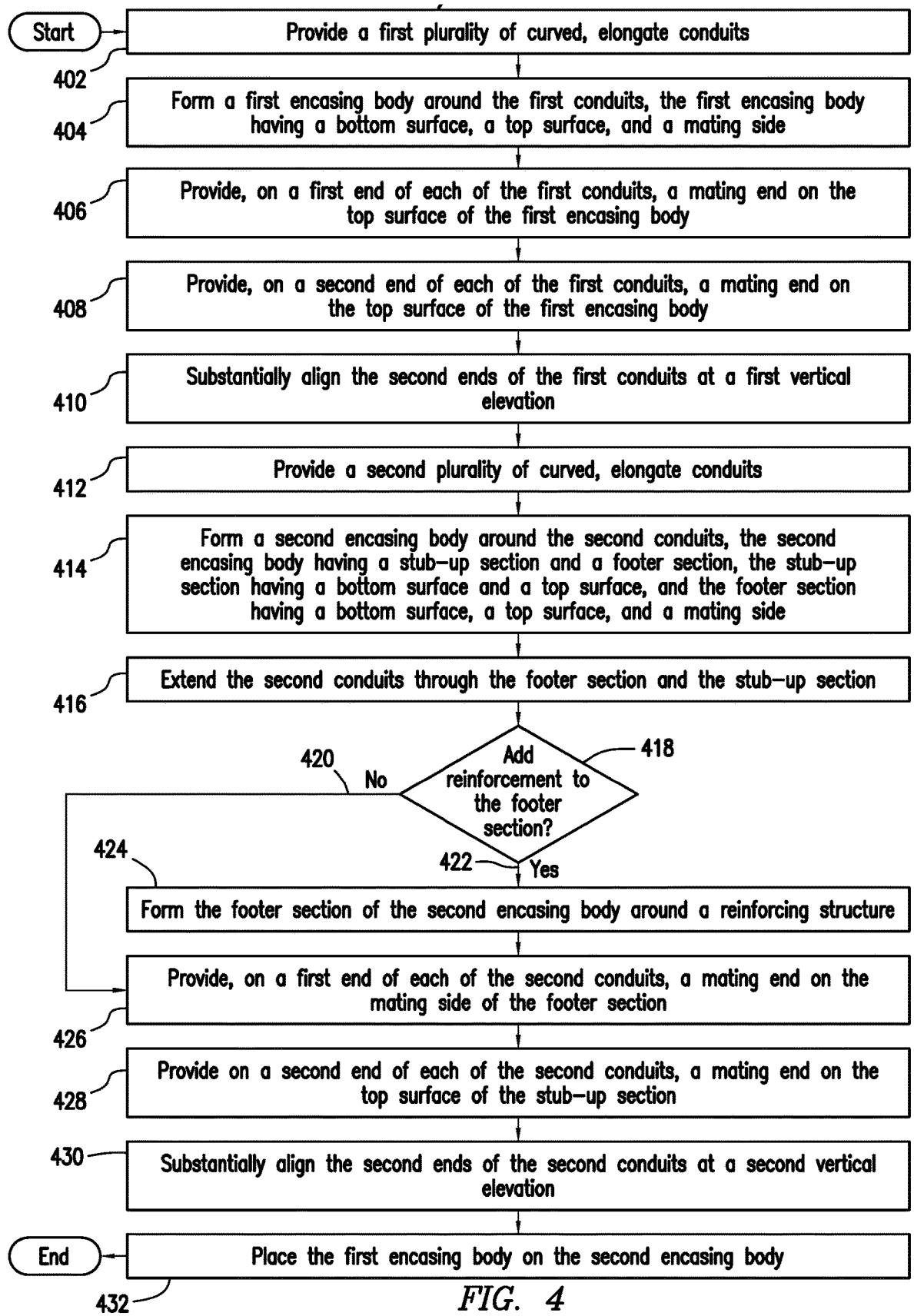
FIG. 4 is a flow chart illustrating a method of making a duct-bank stub-up assembly, according to certain embodiments.

FIG. 4 is a flow chart illustrating a method 400 of making the example duct-bank stub-up assembly 100 of FIG. 1, according to certain embodiments.

Method 400 begins in step 402 where, in some embodiments, a plurality of curved, elongate conduits 104 for receiving and passing through service delivery media is provided. According to particular embodiments, for each conduit 104, a pre-formed conduit elbow 108 is provided. Conduit elbow 108 may be configured to curve such that an end 118 of conduit elbow 108 is proximate to a mating side 126 of an encasing body 120 and an end 112 of conduit elbow 108 is proximate to a mating end on a top surface 124 of an encasing body 120. In some embodiments, conduit elbow 108 may couple to straight, elongate conduits 106 at its ends.

At step 404, conduits 104 are supported at a position suitable for their encasement in stub-up assembly 100. Spacers 114 may be placed to position and space conduits 104 to achieve a predefined geometry and placement, in certain embodiments. At a suitable point during, before, or after the placement and positioning of the conduits, forms may be placed to enable casting.

At step 406, encasing body 120 is formed around conduits 104. In some embodiments, encasing body 120 may be pre-cast in a wet-cast process or a dry-cast process. A cradle may hold conduits 104 in place while the encasing material is poured. Encasing body 120 has a bottom surface 122, top surface 124, and mating side 126. According to particular embodiments, encasing body 120 is sized such that, when the module 102 is placed on footer 140 of the module 130, the first vertical elevation and the second vertical elevation are substantially aligned. Furthermore, in certain embodiments, encasing body 120 may be sized such that, when the module 102 is placed on footer 140 of the module 130, mating end 126 of encasing body 120 and mating end 162 of footer section 140 of encasing body 150 are substantially aligned. In some embodiments, encasing body 120 is formed to have a first alignment mechanism on bottom surface 122 that mates with a corresponding second alignment mechanism on the second encasing body 150.

At step 408, an end 118 of each of conduits 104 provides a mating end on mating side 126 of encasing body 120.

At step 410, an end 112 of each of conduits 104 provides a mating end on top surface 124 of encasing body 120.

At step 412, ends 112 of conduits 104 are substantially aligned at a first vertical elevation.

At step 414, a plurality of curved, elongate conduits 132 for receiving and passing through service delivery media is provided. According to particular embodiments, for each conduit 132, a pre-formed conduit elbow 136 is provided. Conduit elbow 136 may be configured to curve such that an end 148 of conduit elbow 136 is proximate to a mating side 162 of an encasing body 150 and an end 146 of conduit elbow 136 is proximate to a mating end on a top surface 156 of encasing body 150. In some embodiments, conduit elbow 136 may couple to straight, elongate conduits 134 at its ends.

At step 416, second conduits 132 are supported at a position suitable for their encasement in the stub-up assembly. Spacers 144 may be placed to position and space conduits 104 to achieve a predefined geometry and placement, in certain embodiments. At a suitable point during, before, or after the placement and positioning of the conduits, forms may be placed to enable casting.

At step 418, encasing body 150 is formed around second 132. In some embodiments, encasing body 150 may be pre-cast in a wet-cast process or a dry-cast process. A cradle may hold conduits 132 in place while the encasing material is poured.

At step 420, conduits 132 are extended through footer section 140 and stub-up section 152.

At step 422, reinforcement may or may not be added to footer section 140. If at step 422 reinforcement is added, the method continues to step 424. If at step 422 reinforcement is not added, the method continues to step 426.

At step 424, footer section 140 of encasing body 150 is formed around a reinforcing structure, such as rebar.

At step 426, an end 148 of each of conduits 132 provides a mating end on mating side 162 of encasing body 150.

At step 428, an end 146 of each of conduits 132 provides a mating end on top surface 156 of encasing body 150.

At step 430, ends 146 of conduits 132 are substantially aligned at a second vertical elevation.

At step 432, encasing body 120 is placed on footer 140 of second body 150. According to particular embodiments, one or more layers of cushion material may be placed between top surface 160 of footer 140 and bottom surface 122 of encasing body 120 prior to installation of encasing body 120 to prevent spalling.

Modifications, additions, or omissions may be made to method 400 described herein without departing from the scope of the invention. The steps may be combined, modified, or deleted where appropriate, and additional steps may be added. For example, first encasing body may be formed with a stub-up section and a footer section step 406, in some embodiments. Additionally, the steps may be performed in any suitable order without departing from the scope of the present disclosure.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A duct-bank stub-up assembly comprising:
  a first duct-bank stub-up module formed before placement, the first module comprising:
    a first plurality of curved, elongate conduits for receiving and passing through service delivery media, wherein the first plurality of conduits is comprised of generally parallel conduits in a predefined array; and
    a first encasing body formed to have a bottom surface, a top surface, and a mating side, wherein the first encasing body is pre-formed around the array of conduits, which are arranged on and during pre-forming of the first encasing body supported in position within the encasing body by a spacer lattice, such that, for each of the first conduits, a first end of the conduit provides a mating end on the mating side of the first encasing body and a second end of the conduit provides a mating end on the top surface of the first encasing body, and wherein the second ends of the first conduits are substantially aligned at a first elevation relative to the top surface; and
  a second duct-bank stub-up module formed before placement, the second module comprising:
    a second plurality of curved, elongate conduits for receiving and passing through service delivery media, wherein the second plurality of conduits is comprised of generally parallel conduits in a predefined array;
    a second encasing body formed to have a stub-up section and a footer section, the stub-up section having a bottom surface and a top surface, and the footer section having a bottom surface, a top surface, and a mating side, wherein the second encasing body is pre-formed around the array of conduits, which are arranged on and during pre-forming of the second encasing body supported in position within the encasing body by a spacer lattice, such that the second conduits extend through the footer section and the stub-up section, and for each of the second conduits, a first end of the conduit provides a mating end on the mating side of the footer section and a second end of the conduit provides a mating end on the top surface of the stub-up section, and wherein the second ends of the second conduits are substantially aligned at a second vertical elevation;
  wherein the first module is positioned on the footer of the second module; and
  wherein the first and second modules are sized such that the first vertical elevation and the second vertical elevation are substantially aligned.

2. A duct-bank stub-up assembly comprising:
  a first duct-bank stub-up module formed before placement, the first module comprising:
    a first plurality of curved, elongate conduits for receiving and passing through service delivery media; and
    a first encasing body formed to have a bottom surface, a top surface, and a mating side, wherein the first encasing body is formed around the first conduits such that, for each of the first conduits, a first end of the conduit provides a mating end on the mating side of the first encasing body and a second end of the conduit provides a mating end on the top surface of the first encasing body; and
  a second duct-bank stub-up module formed before placement, the second module comprising:
    a second plurality of curved, elongate conduits for receiving and passing through service delivery media,
    a second encasing body formed to have a stub-up section and a footer section, the stub-up section having a bottom surface and a top surface, and the footer section having a bottom surface, a top surface, and a mating side, wherein the second encasing body is formed around the second conduits such that the second conduits extend through the footer section and the stub-up section, and for each of the second conduits, a first end of the conduit provides a mating end on the mating side of the footer section and a second end of the conduit provides a mating end on the top surface of the stub-up section;

wherein the first module is sized for placement on the footer of the second module.

3. The assembly of claim 2, wherein the first and second modules are sized such that, when the first module is positioned on the footer of the second module, the first vertical elevation and the second vertical elevation are substantially aligned.

4. The assembly of claim 2, wherein the first and second modules are sized such that, when the first module is positioned on the footer of the second module, the mating end of the first encasing body and the mating end of the footer section of the second encasing body are substantially aligned.

5. The assembly of claim 2, wherein the bottom surface of the first encasing body has a first alignment mechanism that mates with a corresponding second alignment mechanism on the top surface of the footer section of the second encasing body.

6. The assembly of claim 2, wherein each of the first and second conduits is comprised of straight, elongate conduits and a pre-formed conduit elbow, the conduit elbow configured to curve such that a first end of the conduit elbow is proximate to the mating side of the first encasing body and a second end of the conduit elbow is proximate to the mating end on the top surface of the first encasing body, and the conduit elbow further configured to couple to the straight, elongate conduits on the first and second ends.

7. The assembly of claim 2, wherein at least one end of each of the first and second conduits comprises a belled end, the belled end comprising a gasket for forming a watertight seal when coupled to a corresponding conduit end.

8. The assembly of claim 2, wherein the first plurality of conduits is comprised of generally parallel conduits in a predefined array, and the second plurality of conduits are comprised of generally parallel conduits in a predefined array.

9. The assembly of claim 2, wherein the first and second encasing bodies are pre-formed around the first and second conduits, which are arranged on and during pre-forming of the first and second encasing bodies supported in position within each encasing body by a spacer lattice.

10. The assembly of claim 2, wherein the mating side of the second encasing body footer section has a shear transfer mechanism associated therewith for engagement with a corresponding shear transfer mechanisms of an adjacent duct-bank assembly, said shear transfer mechanism for resisting relative motion between the footer section and an encasing body of the abutting, adjacent duct-bank assembly module resulting from differential shear loading between said second encasing body footer section and an encasing of the abutting, adjacent duct-bank assembly module.

11. The assembly of claim 2, wherein the assembly further comprises one or more layers of cushion material between the top surface of the second module footer and the bottom surface of the first module.

12. A method of making a duct-bank stub-up assembly comprising:
providing a first plurality of curved, elongate conduits for receiving and passing through service delivery media;
supporting the first conduits at a position suitable for their encasement in the stub-up assembly;
forming a first encasing body around the first conduits, the first encasing body having a bottom surface, a top surface, and a mating side;
providing, on a first end of each of the first conduits, a mating end on the mating side of the first encasing body;
providing, on a second end of each of the first conduits, a mating end on the top surface of the first encasing body;
providing a second plurality of curved, elongate conduits for receiving and passing through service delivery media;
supporting the second conduits at a position suitable for their encasement in the stub-up assembly;
forming a second encasing body around the second conduits, the second encasing body having a stub-up section and a footer section, the stub-up section having a bottom surface and a top surface, and the footer section having a bottom surface, a top surface, and a mating side, wherein the formation of the second encasing body further comprises extending the second conduits through the footer section and the stub-up section;
providing, on a first end of each of the second conduits, a mating end on the mating side of the footer section; and
providing, on a second end of each of the second conduits, a mating end on the top surface of the stub-up section.

13. The method of claim 12, further comprising forming the footer section of the second encasing body around a reinforcing structure.

14. The method of claim 12, further comprising sizing the first and second modules such that, when the first module is positioned on the footer of the second module, the first vertical elevation and the second vertical elevation are substantially aligned.

15. The method of claim 12, further comprising sizing the first and second modules such that, when the first module is positioned on the footer of the second module, the mating end of the first encasing body and the mating end of the footer section of the second encasing body are substantially aligned.

16. The method of claim 12, wherein the bottom surface of the first encasing body has a first alignment mechanism that mates with a corresponding second alignment mechanism on the top surface of the footer section of the second encasing body.

17. The method of claim 12, wherein the step of providing the first and second conduits comprises providing, for each of the first and second conduits, a pre-formed conduit elbow, the conduit elbow configured to curve such that a first end of the conduit elbow is proximate to the mating side of the first encasing body and a second end of the conduit elbow is proximate to the mating end on the top surface of the first encasing body, and the conduit elbow further configured to couple to straight, elongate conduits on the first and second ends.

18. The method of claim 12, wherein the steps of supporting the first and second conduits comprises placing spacers that position and space the first and second conduits in a predefined array.

19. The method of claim 12, including providing at the mating side of the second encasing body footer section a shear transfer mechanism associated therewith for engagement with a corresponding shear transfer mechanisms of an adjacent duct-bank assembly, said shear transfer mechanism for resisting relative motion between the footer section and an encasing body of the abutting, adjacent duct-bank assembly module resulting from differential shear loading between said second encasing body footer section and an encasing of the abutting, adjacent duct-bank assembly module.

20. The method of claim 12, further comprising placing one or more layers of cushion material between the top surface of the second module footer and the bottom surface of the first module.

* * * * *